Dec. 12, 1950     W. C. STARKEY     2,533,973
TORQUE LIMITING DEVICE
Original Filed Nov. 1, 1943     2 Sheets—Sheet 1
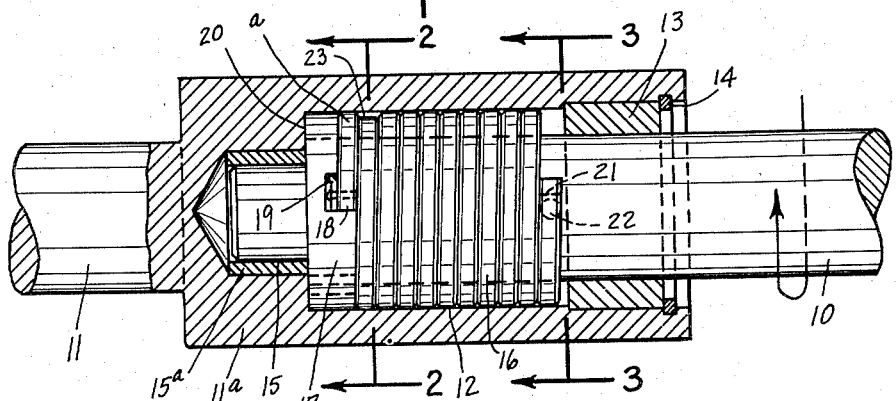
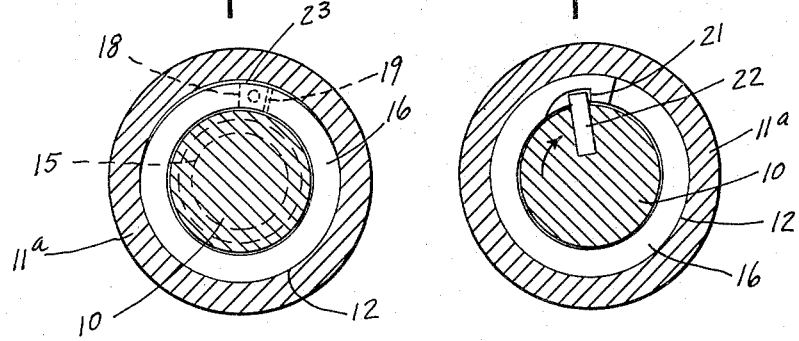
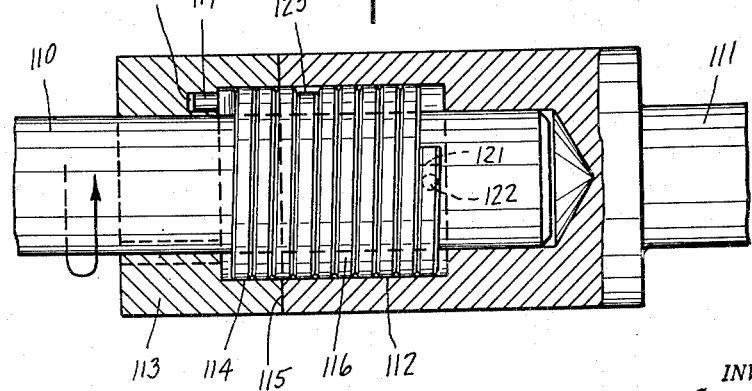
INVENTOR.
WILLIAM CARLETON STARKEY.
BY
Lockwood, Goldsmith & Galt,
ATTORNEYS.

Dec. 12, 1950 W. C. STARKEY 2,533,973
TORQUE LIMITING DEVICE
Original Filed Nov. 1, 1943 2 Sheets—Sheet 2
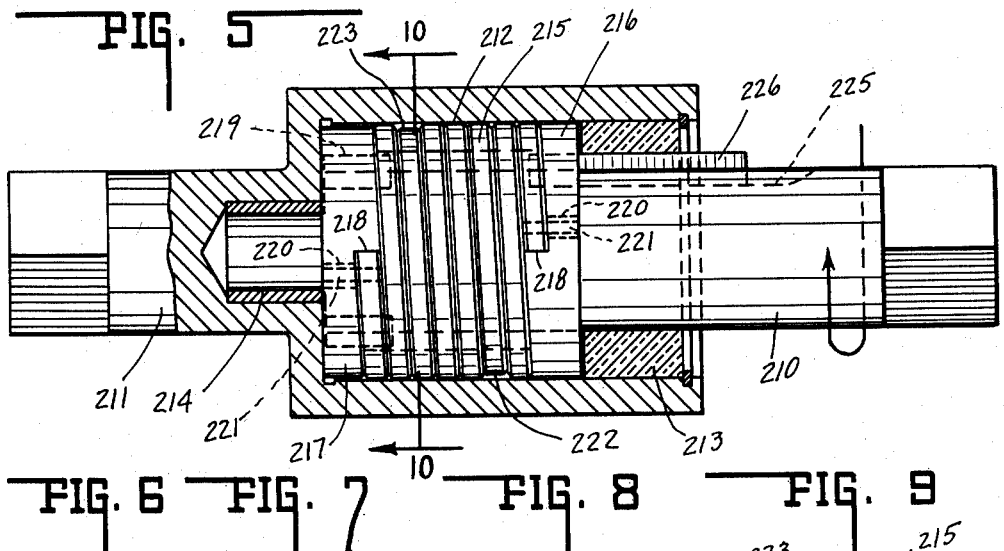
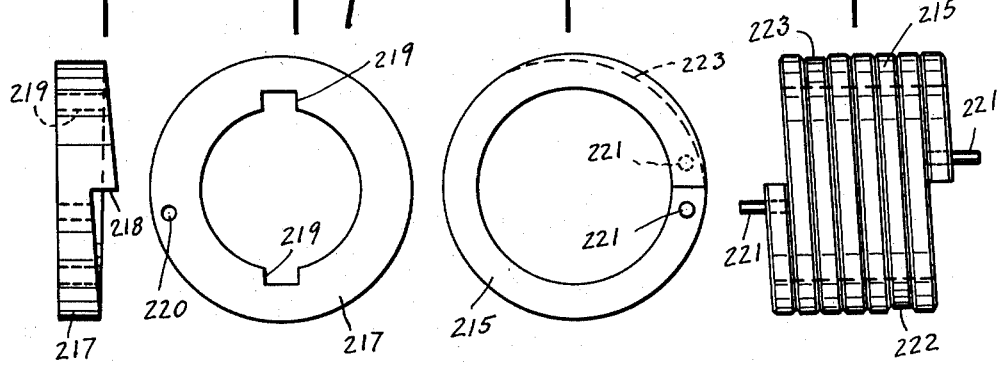
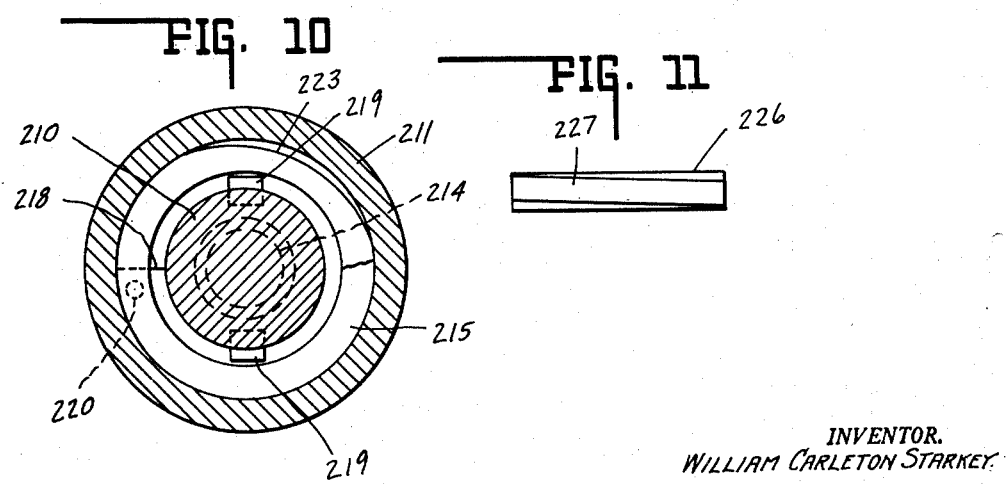
INVENTOR.
WILLIAM CARLETON STARKEY.
BY
Lockwood, Goldsmith & Galt.
ATTORNEYS.

Patented Dec. 12, 1950

2,533,973

UNITED STATES PATENT OFFICE 2,533,973

TORQUE LIMITING DEVICE

William Carleton Starkey, Indianapolis, Ind., assignor to Fletcher Trust Company, trustee, Indianapolis, Ind., a corporation Original application November 1, 1943, Serial No. 508,601, now Patent No. 2,459,972, dated January 25, 1949. Divided and this application July 12, 1947, Serial No. 760,669

19 Claims. (Cl. 64—30)

This invention relates to a torque limiting spring clutch device, this being a division of my application for Letters Patent Serial No. 508,601, filed November 1, 1943, entitled "Torque Limiting Device," now Patent No. 2,459,972, dated January 25, 1949.

The invention is particularly useful and applicable in maintaining a non-slipping friction driving connection between driving and driven members up to a predetermined driving torque while enabling slippage upon imposition of overload torque.

For example, the invention may be applied to stud, nut and screw drivers, bottle cap applicators, tapping devices and like tools, wherein it is desired that the stud, nut, screw, cap or the like, is to be applied under a predetermined torque for proper setting. The invention may similarly be applicable to power devices, such as are employed in engine starters, road working machinery, stokers and the like to protect the operating parts against damage due to excessive overload.

The three illustrated embodiments of subject invention are of the internal drum type in which at least one of the two (driving and driven) members served by the clutch spring has an internal clutching surface against which the clutching coil portions of the spring are normally expanded or seated by inherent spring force so that the spring will be self-energized, and the spring has enough coils to enable transmission of torque far above the desired limit. As explained in my aforesaid patent, overload rejection is accomplished by enabling a predetermined amount of angular relative movement of said members which, in turn, causes sufficient contraction of the seated spring to enable continued slippage between it and the drum surface or surfaces involved during continuance of the overload. Non-slipping is resumed automatically as soon as the imposed torque falls below the overload value.

The said angular relative movement in the instant invention is permitted by conjoint action of a minor clutching coil portion of the spring designed to initially slip on its coacting drum surface as the overload point is reached and a special flexible hence torque sensitive coil portion which operates to enable the major clutching coil portion to remain in full clutching engagement up to the instant slippage of the minor portion occurs.

The special flexible coil portion is normally substantially bypassed by the torque forces imposed on the clutch, which is to say it is protected from subjection thereby to substantial flexing strain until overload and said initial slippage of the minor portion occurs. The yieldable load sensitive element (indicating an important object) has to carry only a minor fraction of the load desired to be transmitted, wherefore said element can, for example, be a peripherally relieved and thus reduced section portion of a suitable simple helical clutch spring wound from uniform section stock.

Another feature of the invention resides in so arranging a torque limiting spring clutch that limited torque may be transmitted in either direction through a single clutch spring.

Still a further feature of the invention resides in adjusting the angular relation of the driving and driven members such as to vary the extent of the angular displacement therebetween required to unload the load transmitting coils of the spring. By means thereof the maximum driving torque permitted by the device may be varied.

The full nature of the invention will be understood from the accompanying drawings and the following description and claims:

Fig. 1 is a longitudinal sectional view through the device with parts thereof shown in elevation.

Fig. 2 is a section taken on the line 2—2 of Fig. 1.

Fig. 3 is a section taken on the line 3—3 of Fig. 1.

Fig. 4 is the same as Fig. 1, showing a modified form of the invention.

Fig. 5 is the same as Fig. 1, showing a further modified form of the invention.

Fig. 6 is a side elevation of one of the driving elements of Fig. 5.

Fig. 7 is an end elevation of the driving element of Fig. 6.

Fig. 8 is an end view of the clutch spring of Fig. 5.

Fig. 9 is a side elevation of the clutch spring shown in Figs. 5 and 8.

Fig. 10 is a section taken on the line 10—10 of Fig. 5.

Fig. 11 is a plan view of the adjusting key of Fig. 5.

In Figs. 1 to 3, inclusive, there is shown one modification of torque limiting device wherein there is provided a driving member comprising a shaft 10, and a driven member comprising a shaft 11 provided with a driven pocket 11a having a cylindrical internal clutch surface 12. The driving member 10 may be driven from any suitable source of power or by hand, and through the torque limiting device drives the driven member or pocket 11a on the driven shaft 11 up to a predetermined maximum torque. The driven member 11a or its shaft 11 may be of various forms as required for the power driven mechanism to which it is applied, or may be provided with suitable connections, chucks or tools as desired.

The pocket 11a may be provided with a bearing sleeve 13 secured within the open end thereof by a retaining ring 14, whereby the driving shaft has its bearing within said sleeve at one end of the pocket. Adjacent the other end thereof, the end of the driving shaft is provided with a reduced spindle 15 rotatable in a bearing sleeve 15a mounted within a reduced bore of the pocket.

The clutch spring 16 surrounds the driving shaft 10 and is embraced within the pocket 11a for self-energizing clutching engagement with the internal clutch surface thereof under its inherent spring force. One end of the clutch spring 16 is secured to a helical torque transmitting collar 17 having a shoulder against which the load carrying end 18 of the spring abuts, being removably secured thereto by a locking member 19. Said collar 17 is mounted for free rotation within the pocket 11a and is keyed to the driving shaft 10 to bear against a thrust shoulder 20 of the pocket 11a.

Said spring 16, being normally in clutching engagement with the clutch surface 12, upon a driving torque being applied to the shaft 10 in the direction of the arrow, said spring will be rotated by the collar 17 in the clutching direction or to maintain its expanded clutching engagement within the pocket to normally provide a positive driving connection between the driving and driven members. Upon the torque being applied in the other or declutching direction, the clutch will freely overrun.

At the opposite unloading end of the spring 16, as shown in Fig. 3, there is provided an undercut recess having a shoulder 21. Extending into said recess for movement into abutting engagement with said shoulder there is a deenergizing or unloading element in the form of a pin 22. Said pin is normally out of engagement with said shoulder during normal driving action.

The load sensitive flexible element of said device is in the form of a reduced coil or relieved portion of the clutch spring, as indicated at 23. It carries only a fraction of the total load. To permit its load limiting action, its clearance relative to the pocket must be such that the coil never expands into complete engagement therewith at the maximum load to be transmitted. This load sensitive element is of such physical characteristics that in association with the load carrying coil indicated at a, they will withstand a normally applied torque load, but upon overload sufficient to slip the load carrying coil and flex the coil 23 outwardly, the driving and driven members will be angularly displaced relative to each other. Such angular displacement causes the unloading element in the form of the pin 22 to engage the unloading end of the clutch spring in the form of the shoulder 21, and as the relative movement between the unloading element and spring is in the direction of the arrow of Fig. 3, said element tends to unload the spring in a wrap down direction sufficiently to permit such slippage as to prevent the excess load from being transmitted there through.

As a result of this action, the non-slipping driving connection between the driving and driven members is released as to any torque being transmitted therebetween above the predetermined load, controlled by the load sensitive element or relieved coil of the spring. However, upon the overload being removed or relieved, the inherent stresses in the clutch spring, and particularly the relieved load sensitive portion thereof, will return it to normal non-slipping clutching engagement with the clutch surface to transmit the driving torque up to its normal predetermined maximum.

From the above, it will be observed that the clutch spring embodies a load carrying coil at its load carrying end, as indicated at $a$. The relieved coil 23 permits the coil $a$ to slip independently of the other clutching coils and slippage of the coil $a$ permits the coil 23 to flex as the overload is approached. Upon full overload such slippage and flexing results in sufficient angular displacement to unload the remaining coils of the spring between the load sensitive coil and the unloading end of the spring at 21. These coils act in the nature of load transmitting coils which assist the load carrying coil in transmitting the torque up to the overload. Said load transmitting coils each carry less and less of the load transmitted as they approach the unloading end 21. As the overload increases, the angular displacement will increase and the clutching action of the load transmitting coils will be progressively reduced from the unloading end to the load sensitive coil. In this manner the clutch spring acts to transmit torque within the maximum permitted, but not beyond. The predetermined maximum torque at which the device will drive, is, therefore, governed by the clutching power of the load carrying coil $a$ in conjunction with the flexibility of the load sensitive coil 23 and the degree of angular displacement between the pin 22 and shoulder 21 required to unload the load transmitting coils.

One advantage of this action resides in the load sensitive element, or coil 23 being by-passed by the torque transmitting character of the load transmitting coils and the load carrying coil $a$. Thus, only a fraction of the torque load is carried by the coil 23.

In the modification of the torque limiting device shown in Fig. 4, a driving member in the form of the shaft 110 rotating in the direction of the arrow is adapted to drive the driven member 111. The member 111 is provided with a driven pocket having an internal cylindrical clutch surface 112. The driving member has keyed thereto a driving pocket 113 having an internal cylindrical clutch surface 114 adapted to abut and mate with the surface 112. The clutch spring 116 is mounted within the abutting pockets and is normally expanded into clutching engagement with their respective clutch surfaces. This arrangement is referred to as a split or double pocket type of torque limiting device, the split being indicated at 115. Thus, at the split 115 the clutch pockets may rotate relative to each other. However, the clutch spring, being in normal clutching engagement with both pockets, positively transmits the driving torque from one to the other through the load carrying coil which spans the split 115.

At the anchored end of the spring 116 it is provided with a toe 117 extending laterally into a recess 118 formed in the pocket 113 to lock therewith. At the other or unloading end of said spring, the shaft 110 carries an unloading or deenergizing element in the form of a pin 122 freely movable within a recess formed in the underside of the spring adjacent its unloading end and which is movable into engagement with the shoulder 121 formed thereby, in the manner illustrated in Fig. 3. The load sensitive element, as above described in connection with Figs. 1, 2, and 3, comprises the reduced coil or relieved portion of the spring, as indicated at 123. Said relieved portion 123 is preferably located at approximately one coil removed from the load carrying coil which spans the split 115 between the pockets, and is spaced inwardly from the driven pocket. Thus, with the spring in normal clutching engagement relative to said pockets, the full load carrying coil spans the split 115 and the additional load transmitting coils in clutching engagement with the clutch surface of the driven pocket are separated therefrom by the relieved coil 123; said load transmitting coils each carrying less and less of the load transmitted as they approach the unloading end 121.

The operation of this split pocket form of torque limiting device is similar in all respects to that above described, in that the driven pocket is positively connected to the driving pocket through the action of all the clutching coils of the spring for transmitting normal driving torque. Upon the torque load becoming excessive due to overload, the spanning load carrying coil will be caused to slip and permit the load sensitive coil to flex, thereby permitting angular displacement between the driving and driven members. This permits the pin 122 to engage the shoulder 121 to move the unloading end of the spring in a direction tending to wrap down the load transmitting coils to permit slippage thereof relative to the clutch surface 112 and thereby release the driven member from the driving member to the extent of the overload.

In the modified form of the invention illustrated in Figs. 5 to 11, inclusive, the torque limiting device is arranged to provide a dual action wherein the overload release may become effective when driven in either direction. When driven in the direction of the arrow, the driving member comprises the shaft 210, and the driven member comprises the shaft 211 with its pocket to provide the clutch surface 212. The shaft 210 is supported by the bearing sleeves 213 and 214 carried in the pocket of the shaft 211. Torque is transmitted between the driving and driven members by the clutch spring 215 normally in clutching engagement with the clutch surface 212. Said shaft 210 has keyed thereto the oppositely disposed helical torque transmitting collars 216 and 217, each being provided with a laterally offset shoulder 218 against which the respective ends of the clutch spring 215 abut. Each of said collars is provided with a keyway 219 whereby it is keyed to the shaft 210, and each is provided with a hole 220 for receiving a loose fitting deenergizing or unloading pin 221 extending outwardly from the clutch spring adjacent each of the opposed ends thereof. Said pins 221 are of lesser diameter than their respective receiving holes 220 so that they have free play therein.

The load sensitive flexible element, as in the preceding modifications, comprises one or the other of a pair of reduced or relieved portions or coils of the spring, as indicated at 222 and 223, there being one of such relieved portions in each of the coils next adjacent the end coils of the spring. Said end coils function interchangeably as the load carrying coil and the unloading coil depending on the direction of drive.

By means of this arrangement, upon the driving shaft 210 being rotated in the direction of the arrow, the torque transmitting collar 216 abutting the end of the spring at 218, will transmit the full torque to that end of the spring, tending to expand the spring into tighter clutching engagement with the pocket of the then driven member 211. Said spring thereby transmits the driving torque from the shaft 210 directly to said member 211. However, upon an overload being applied, the load carrying coil will slip and the load sensitive element in the form of the relieved coil 222 of the spring adjacent the collar 216, which always carries only a fraction of the total load, will be caused to flex outwardly toward the pocket and thereby permit of the angular displacement between the shaft 210 and the unloading end of the clutch spring which abuts the collar 217. Such displacement will cause the collar 217, which then becomes the deenergizing or unloading element, to move relative to the end of the spring abutting thereagainst, until the free play between its pin 221 and the hole 220 in said collar is taken up. Thereupon further displacement causes said end of the spring to be pulled in a direction tending to wrap it down from its normal clutching engagement with the clutch surface of the pocket of the shaft 211 and thereby permit slippage as long as the overload is applied.

On the other hand, wherein the shaft 210 is driven in the opposite direction to that shown in the arrow, the reverse action takes place. Thus, the collar 217 will act to transmit torque through abutting engagement with the spring at 218, and upon overload the load sensitive element 223 adjacent the collar 217 will be flexed to permit the angular displacement above referred to. The play between the pin and hole in the collar 217 will be taken up and said collar will pull the unloading end of the spring sufficiently to wrap it down out of its normal clutching engagement. Thus, in this form of the invention the overload becomes effective irrespective of the direction of drive of the driving member.

As shown in Figs. 5 and 11, the shaft 210 is provided with a keyway 225 for receiving an adjusting key 226. Said key is slidable longitudinally of the shaft through a corresponding keyway in the bearing sleeve 213 and the collar 216. The base of the key is straight, as shown in Fig. 11. However, the upper portion of the key which slides in the collar 216 is angled, as indicated at 227, so that as the key is caused to slide upon the shaft, its angular engagement with the collar is such as to shift the collar peripherally relative to the shaft. This adjustment is such as to cause a slight angular displacement between the collar 216, on the one hand, and all of the other elements, including the shaft 210 and collar 217. Such displacement varies the relation of the unloading pin 221 relative to the collar 217 so that it has a greater or lesser movement before the unloading action becomes effective. The result of such displacement is that a greater or lesser torque load will be required to flex the load sensitive element in order to unload or wrap the spring down to permit slippage.

From the foregoing, it will be observed that in respect to the various modifications there is involved in each of them a clutch spring having one or more coils or portions thereof relieved or reduced in diameter for acting as the load sensitive element in association with a load carrying coil or coils. Whereas, the load sensitive element is herein shown as a relieved portion of the spring, it may comprise a portion of such diameter as to permit free play relative to the clutch surface and of such character or formation as to flex for permitting slippage of its associated load carrying coil resulting in angular displacement between the ends of the spring or members upon an overload. Such angular displacement acts to bring into play a deenergizing or unloading element, herein shown in the form of a collar or pin connected with the driving member, which tends to unload or deenergize that end of the spring associated therewith to permit slippage of the entire spring relative to the clutch surface sufficient to disconnect the positive driving connection between the driving and driven members.

Whereas, the several modifications of the invention are shown herein for purpose of illustration as embodying a spring having an external clutching surface, the invention is equally applicable to modifications wherein the clutch spring is of a character having an internal clutching surface. Furthermore, it is unimportant as to whether or not the load carrying end of the spring or its unloading end is connected with the driving member or the driven member, the same principle of operation as above described being equally effective, wherein the clutch spring has a portion thereof adapted to slip and flex upon overload to permit of angular displacement between its load carrying and unloading ends.

The invention claimed is:

1. A torque limiting device including a driving member, a driven member, one of said members being provided with a clutch surface, a clutch spring having expansible and contractible coils normally in friction clutching engagement with said clutch surface including an unloading end and a load carrying coil spaced therefrom and connected with the other of said members through which a driving torque will be transmitted, a non-clutching coil of the spring adjacent the load carrying coil normally locked thereby against flexing but rendered free to flex upon slippage of the load carrying coil to permit angular displacement of said members, and a deenergizing element on the said other said member operable by said angular displacement to move into deenergizing engagement with the unloading end of said spring tending to progressively unload the coils thereof to the extent that said non-clutching coil is flexed, and thereby limit the clutching capacity of said spring to a predetermined maximum torque load.

2. A torque limiting device including a driving member, a driven member, one of said members being provided with a clutch surface, a clutch spring having expansible and contractible coils normally in friction clutching engagement with said clutch surface, said spring having a load carrying portion operably connected with the other of said members through which a driving torque will be transmitted, a load sensitive portion embodied in said spring between the ends thereof adapted to limit the load carrying capacity of said load carrying portion and flex upon slippage thereof under an overload torque to permit angular displacement of said members, and a deenergizing element on the member to which said spring is operably connected movable upon angular displacement of said members to deenergizing engagement with the other end of said spring tending to progressively unload the coils thereof to the extent that said load sensitive portion is flexed, thereby limiting the clutching capacity of said spring to a predetermined maximum torque load.

3. A torque limiting device including a driving member, a driven member, one of said members being provided with a clutch pocket in which the other member is rotatably mounted, said pocket having an internal clutch surface, a clutch spring having a series of expansible and contractible coils normally in clutching engagement with said clutch surface under inherent spring tension, a load transmitting collar secured to said rotatably mounted member, a load carrying portion operably connected with said collar for transmitting the driving torque between said members, a load sensitive free floating coil embodied in said spring adjacent the load carrying portion thereof adapted to flex upon slippage of said portion under an overload torque, to permit angular displacement of said members, and a deenergizing projection on said rotatably mounted member movable upon said angular displacement for deenergizing engagement with said spring tending to progressively unload the clutching coils thereof to the extent that said load sensitive portion is flexed, and thereby limit the clutching capacity of said spring to a predetermined maximum torque load.

4. A torque limiting device including a driving member, a driven member, one of said members being provided with a clutch pocket in which the other member is rotatably mounted, said pocket having an internal clutch surface, a clutch spring having a series of expansible and contractible coils normally in clutching engagement with said clutch surface under inherent spring tension, said spring having a load carrying coil engaging the said pocket adapted to slip upon overload and a load sensitive coil spaced from said pocket to permit flexing and slippage of the load carrying coil, the latter coil being operably connected with the other said member, to permit angular displacement of said members upon an overload torque, and a deenergizing element on said rotatably mounted member movable upon said angular displacement for deenergizing engagement with said spring tending to progressively unload the clutching coils thereof to the extent that said load sensitive portion is flexed, and thereby limit the clutching capacity of said spring to a predetermined maximum torque load.

5. A torque limiting device including a driving member, a driven member, said members being provided with coaxial aligned and adjacent cylindrical clutch surfaces, a clutch spring having expansible and contractible coils normally in positive clutching engagement with said clutch surfaces including a load carrying portion spanning said adjacent surfaces for transmitting driving torque therebetween, one end of said spring being operably connected with one of said members and the other end of said spring being free floating to provide an unloading end, a load sensitive portion embodied in said spring adjacent said load carrying portion and spaced from one of the clutch surfaces adapted to flex under an overload torque to permit angular displacement of said members upon slippage of said load carrying portion, and a deenergizing element operable by said angular displacement to engage the floating unloading end of said spring tending to progressively unload the coils thereof to the extent that said load sensitive portion is flexed, and thereby limit the clutching capacity of said spring to a predetermined maximum torque load.

6. A torque limiting device including a driving member, a driven member, said members being provided with opposed cylindrical pockets having aligned clutch surfaces, a clutch spring having expansible and contractible coils normally in friction clutching engagement with said clutch surfaces including a load carrying portion spanning the adjacent ends of said pockets for transmitting driving torque therebetween, one end of said spring being operably connected with the pocket of one of said members and the other end of said spring being free floating to provide an unloading end within the other of said pockets, a load sensitive portion embodied in said spring adjacent said load carrying portion and spaced from one of the clutch surfaces adapted to flex under an overload torque to permit angular displacement of said pockets upon slippage of said load carrying portion, and a deenergizing element operable by said angular displacement to engage the unloading end of said spring tending to progressively unload the coils thereof to the extent that said load sensitive portion is flexed, and thereby limit the clutching capacity of said spring to a predetermined maximum torque load.

7. A torque limiting device including a driving member, a driven member, one of said members being provided with a clutch surface, a clutch spring having expansible and contractible coils normally in friction clutching engagement with said clutch surface, torque transmitting elements on the other of said members in operative driving engagement with opposite ends of said spring respectively, a free play connection between the ends of said spring and their respective torque transmitting elements, and a load sensitive portion embodied in said spring adapted to flex under an overload torque to permit angular displacement of said members, one of said elements acting to transmit torque when the driving member is rotated in one direction and the opposed element acting to transmit torque when said member is rotated in the opposite direction, said free play connection of the non-torque transmitting element acting to unload said spring upon said load sensitive portion being flexed.

8. A torque limiting device including a driving member, a driven member, one of said members being provided with a clutch surface, a clutch spring having expansible and contractible coils normally in friction clutching engagement with said clutch surface, torque transmitting elements on the other of said members in operative driving engagement with opposite ends of said spring respectively, a free play connection between the ends of said spring and their respective elements, a load carrying coil adjacent each end of said spring, and a relieved load sensitive coil adjacent each load carrying coil adapted to flex under an overload torque to permit angular displacement of said members, one of said elements acting to transmit torque when the driving member is rotated in one direction and the opposed element acting to transmit torque when said member is rotated in the opposite direction, the non-torque transmitting element acting to unload said spring through its free play connection therewith through said axial displacement upon the load sensitive coil adjacent the load carrying coil being flexed.

9. A torque limiting device including a driving member, a driven member, one of said members being provided with a clutch surface, a clutch spring having expansible and contractible coils normally in friction clutching engagement with said clutch surface, torque transmitting means on the other of said members in driving engagement with opposite ends of said spring, respectively, a free play connection between the ends of said spring and their respective torque transmitting means, a load carrying coil adjacent each end of said spring, a relieved load sensitive coil adjacent each load carrying coil adapted to flex under an overload torque to permit angular displacement of said members, one of said torque transmitting means acting to transmit torque when the driving member is rotated in one direction and the opposed said means acting to transmit torque when said member is rotated in the opposite direction, the non-torque transmitting means acting to unload said spring through its free play connection therewith upon said angular displacement of said members and to the extent that the load sensitive coil adjacent the load carrying coil is flexed, aligned keyways in one of said members and its torque transmitting means, and an angularly formed key adjustable in said keyways to effect angular adjustment therebetween to vary the extent of angular displacement required for unloading said spring to correspondingly vary the maximum torque load transmitted therethrough.

10. A torque limiting device including a driving member, a driven member, one of said members being provided with a clutch surface, a clutch spring having expansible and contractible coils normally in friction clutching engagement with said clutch surface, a torque transmitting element on the other of said members in driving engagement with the load carrying end of said spring, a free play connection between said last-mentioned member and the unloading end of said spring, a load sensitive portion embodied in said spring adjacent the load carrying end thereof adapted to flex upon slippage of said load carrying end under an overload torque to permit angular displacement of said members, said free play connection acting to unload said spring to the extent that said load sensitive portion is flexed, aligned keyways in said element and last-mentioned member, and an angularly formed driving key adjustable in said keyways to effect axial adjustment therebetween and thereby vary the extent of angular displacement required for unloading said spring to correspondingly vary the maximum torque load transmitted therethrough.

11. A torque limiting device including a driving member, a driven member, one of said members being provided with a clutch engaging surface, a clutch spring normally in clutching engagement with said surface, a load sensitive element intermediate the other of said members and a portion of said clutch spring through which driving torque is transmitted, unloading means carried by said last mentioned member movable to unload said spring to permit slippage relative to said clutch surface upon said load sensitive element yielding under an overload to permit axial displacement between said members, and an adjustable connection between said last mentioned member and spring for varying the angular relation of said members and the extent of angular displacement required to cause said unloading element to be effective.

12. A torque limiting device including a driving member, a driven member, one of said members being provided with a clutch engaging surface, a clutch spring having a series of expansible and contractible coils normally in clutching engagement with said surface, one end of said spring being operably connected with the other said member, a load sensitive element effective under an overload torque to permit angular displacement between said members, an unloading element carried by said last mentioned member engagable with the other end of said spring upon said angular displacement tending to unload said spring and permit slippage relative to said clutch surface, and means for adjusting the connection between said last mentioned member and spring for varying the extent of angular displacement between said members required to unload said spring.

13. A torque limiting device including a driving member, a driven member having a clutch engaging surface, a clutch spring having a series of expansible and contractible coils normally in clutching engagement with said clutch surface and having an unloading end, a load sensitive element adjacent the other end of said spring operably connected with said driving member for permitting axial displacement between said members upon an overload torque being applied thereto, an unloading element carried by said driving member movable into operative engagement with the unloading end of said spring in a direction to unload said spring and cause it to slip relative to said clutch surface, and a driving connection between said driving member and the driven end of said spring adjustable to vary the angular relation of said members to correspondingly vary the effective overload torque.

14. A torque limiting device including a driving member, a driven member, one of said members being provided with a clutch surface, a clutch spring having expansible and contractible coils normally in friction clutching engagement with said clutch surface and including an unloading end, a load carrying coil operably connected with the other of said members through which driving torque is transmitted in the clutching direction, a flexible load sensitive element between said first mentioned coils and said load carrying coil adapted to cooperate with said load carrying coil to flex and permit slippage thereof upon an overload torque to effect angular displacement of said members, and a deenergizing element on said other said member operable by said angular displacement to move into operative engagement with the unloading end of said spring and cause it to slip relative to said clutch surface.

15. A torque limiting device including a driving member, a driven member, one of said members being provided with a clutch surface, a clutch spring having expansible and contractible coils normally in friction clutching engagement with said clutch surface and including an unloading end, a load carrying coil operably connected with the other of said members through which driving torque is transmitted, a freely flexible load sensitive element between said first mentioned coils and said load carrying coil adapted to cooperate with said load carrying coil to flex and permit slippage thereof upon an overload torque to effect angular displacement of said members, a deenergizing element operable by said angular displacement movable into operative engagement with the unloading end of said spring and cause it to slip relative to said clutch surface, and a driving connection between said driving member and clutch spring adjustable to vary the angular relation thereof to correspondingly vary the effective overload torque.

16. A torque limiting clutch adapted to couple a driving member to a driven member, and wherein a peripheral clutching surface is co-rotative with one of the members and a helical clutch spring having major and minor clutching portions is co-rotative with the other member in a clutching direction for gripping engagement with the clutching surface, said minor portion having a limited torque transmitting engagement therewith, characterized by a yielding torque sensitive element between said clutching portions, said torque sensitive element and minor portion operating conjointly to enable relative angular movement of said members during imposition thereon of overload torque, and means on said other member movable with said relative angular movement into deenergizing engagement with said major portion to effect torque limiting deenergization of the clutch.

17. A torque limiting clutch adapted to couple a driving member to a driven member, and wherein a peripheral clutching surface is co-rotative with one of the members and a helical clutch spring having a plurality of load carrying coils forming the major portion of said spring and a lesser number of load carrying coils comprising the minor portion of said spring, said spring being co-rotative with the other member in a clutching direction for gripping engagement with the clutching surface through said major portion, and through said minor portion within the limits of a predetermined overload torque, said spring being characterized by a yielding torque sensitive coil intermediate said major and minor portions yieldable upon slippage of said minor portion to permit conjointly therewith relative angular movement of said members during imposition thereon of overload torque, and means on said other member movable with said relative angular movement into deenergizing engagement with the end coil of said major portion to effect torque limiting deenergization of the clutch.

18. In a torque limiting clutch adapted to couple a driving member to a driven member, and wherein a peripheral clutching surface is co-rotative with one of the members, and a helical clutch spring having major and minor clutching portions co-rotative with the other member in the clutching direction for gripping engagement with the clutching surface, the combination of a torque sensitive connection between said major and minor portions operative to enable relative angular movement of said members upon imposition of overload torque in the clutching direction, a clutch spring deenergizing device on the said other member rendered operative by such relative angular movement to move into declutching engagement with said major portion, said device being partially controlled by slippage of said minor portion, and said minor portion providing a driving connection between said major portion and one of said members in parallel or torque by-passing relation to the torque sensitive connection whereby to transmit part of the torque that would otherwise be transmitted by the latter connection alone.

19. A torque limiting spring clutch, comprising a rotary clutch drum, a coaxial rotary member, a helical clutch spring one end of which is operatively connected to said rotary member in a manner to cause the spring to turn always with the rotary member in one direction, the spring having a series of coils at the opposite end in frictional clutching normal-torque-transmitting engagement with the drum, the terminal coil at that end of the spring being free and having a deenergizing shoulder whereby the coils of said series may be progressively withdrawn from clutching engagement with the drum to enable the clutch to reject an overload, the spring having a maximum-load-carrying clutching coil portion and a non-clutching torque sensitive coil portion both located between said series of coils and the connected first mentioned end of the spring, said two coil portions being operative conjointly, one by slippage on the drum and one by resistance to deflection under torque to enable relative angular movement between the rotary member and the drum while engaged with said series of coils, and abutment means connected with said rotary member and engageable with said deenergizing shoulder in a manner to cause said progressive withdrawal of coils of said series out of clutching engagement with the drum.

WILLIAM CARLETON STARKEY.

REFERENCES CITED

The following references are of record in the file of this patent:

UNITED STATES PATENTS

| Number | Name | Date |
| --- | --- | --- |
| 1,126,780 | Jones | Feb. 2, 1915 |
| 1,561,537 | Hayes | Nov. 17, 1925 |
| 2,360,187 | Almen | Oct. 10, 1944 |